April 5, 1960 M. K. BUCHNER ET AL 2,931,405
FRUIT PREPARATION APPARATUS
Filed Sept. 19, 1955 9 Sheets-Sheet 8
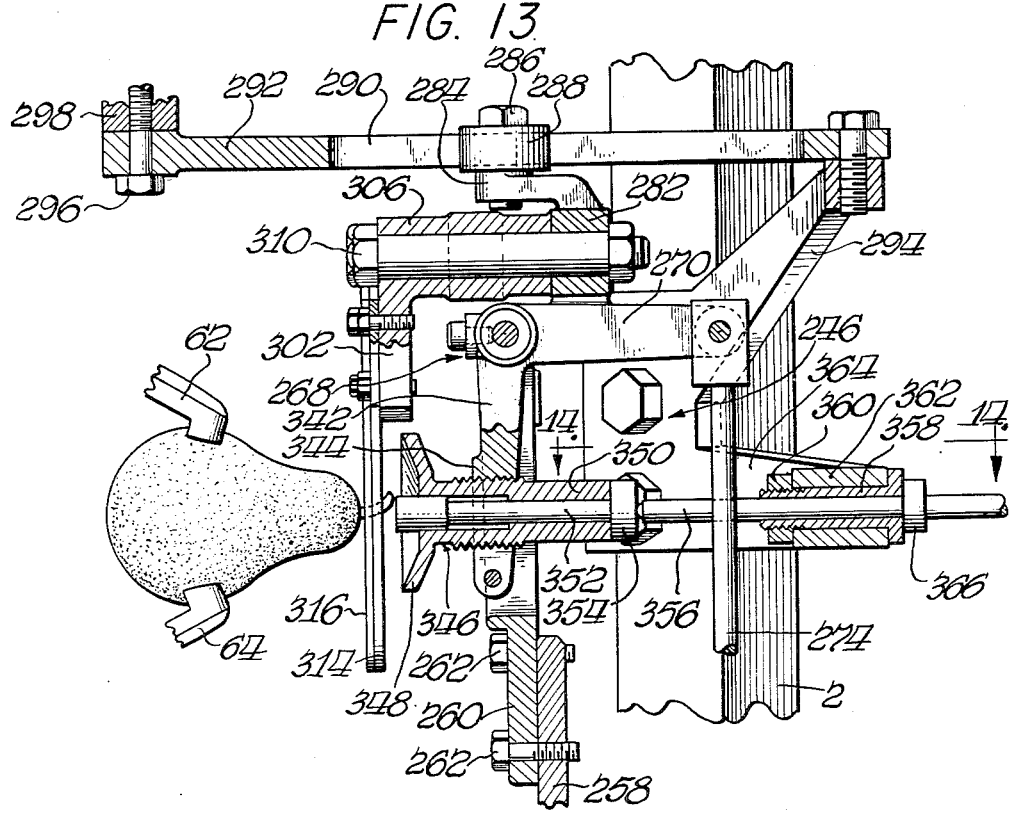
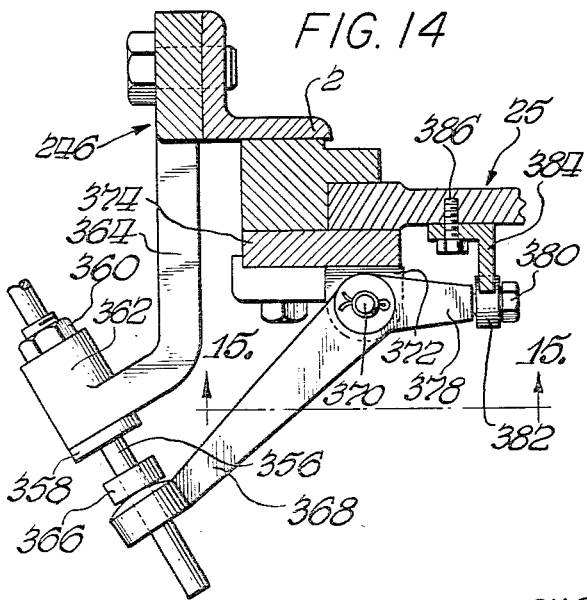
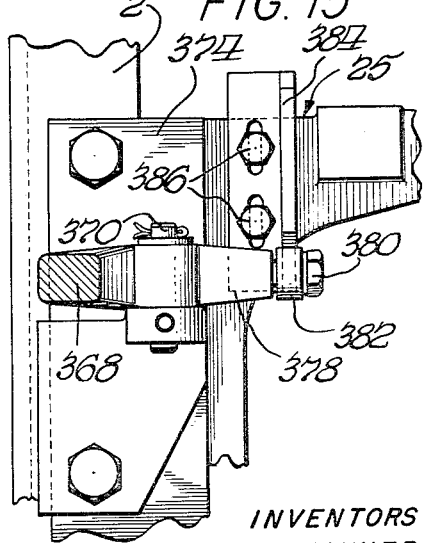
INVENTORS
MARVIN K. BUCHNER
CLARENCE R. THOMPSON
BY Moore, Prangley & Clayton
ATTORNEYS

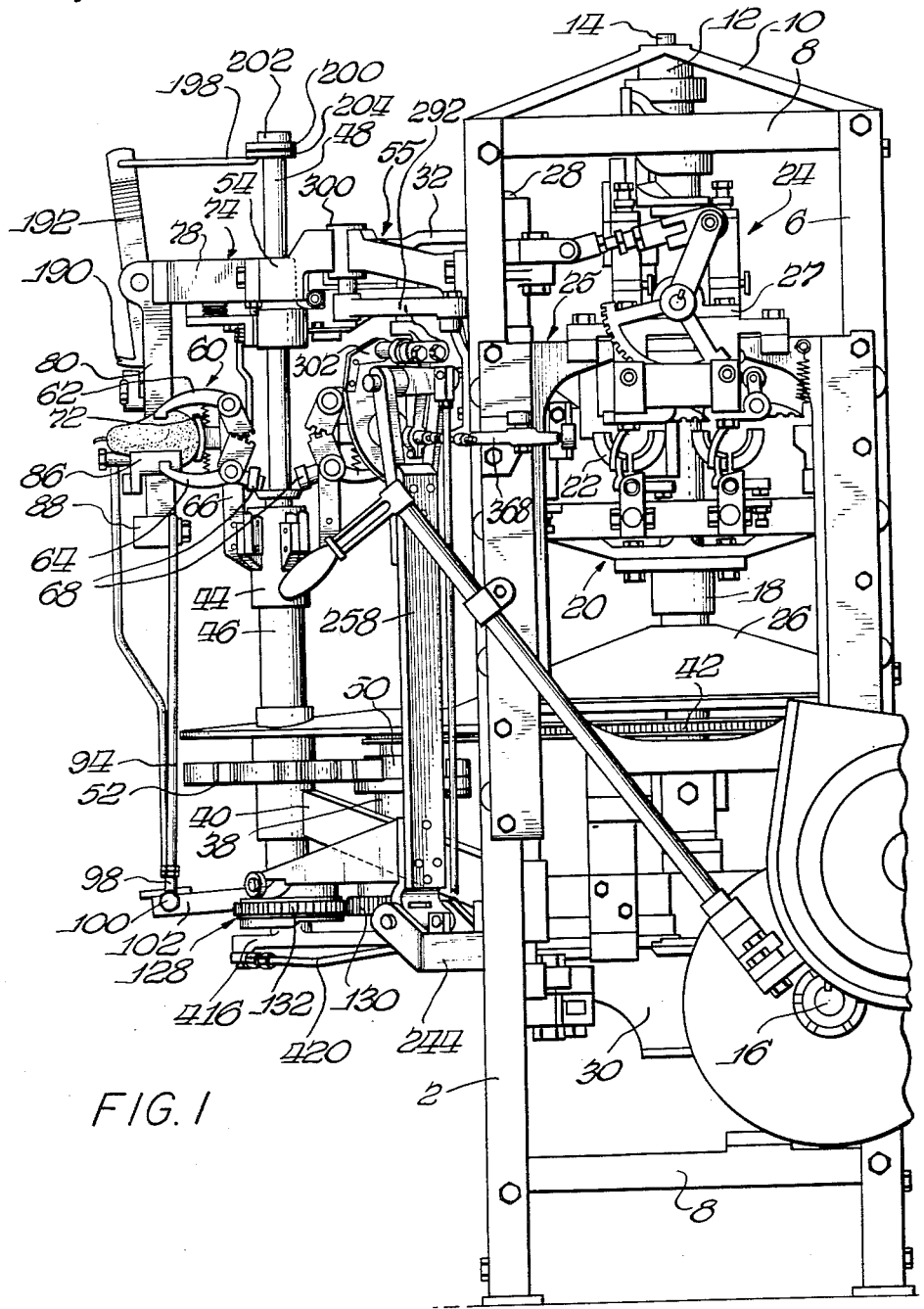

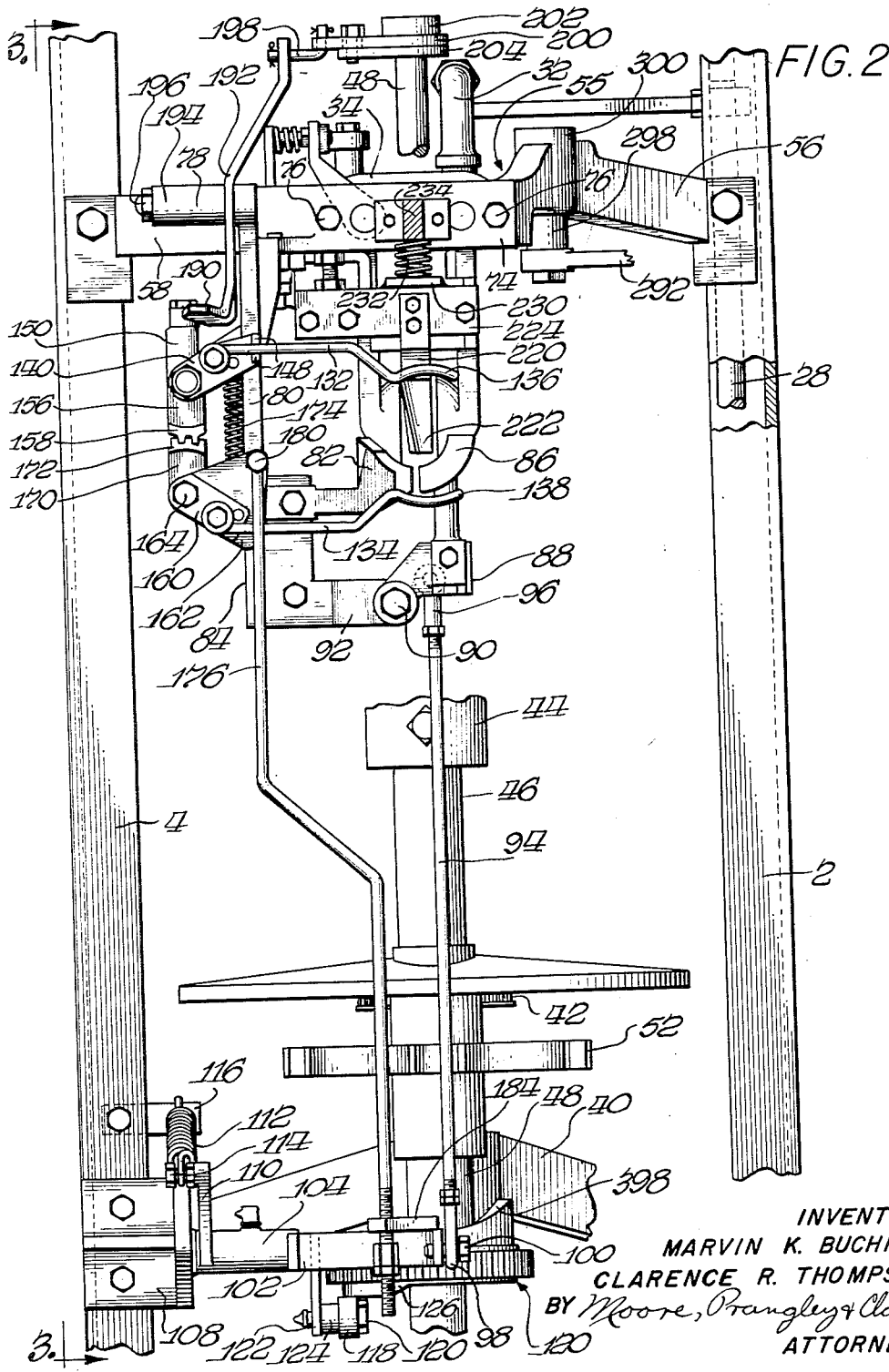

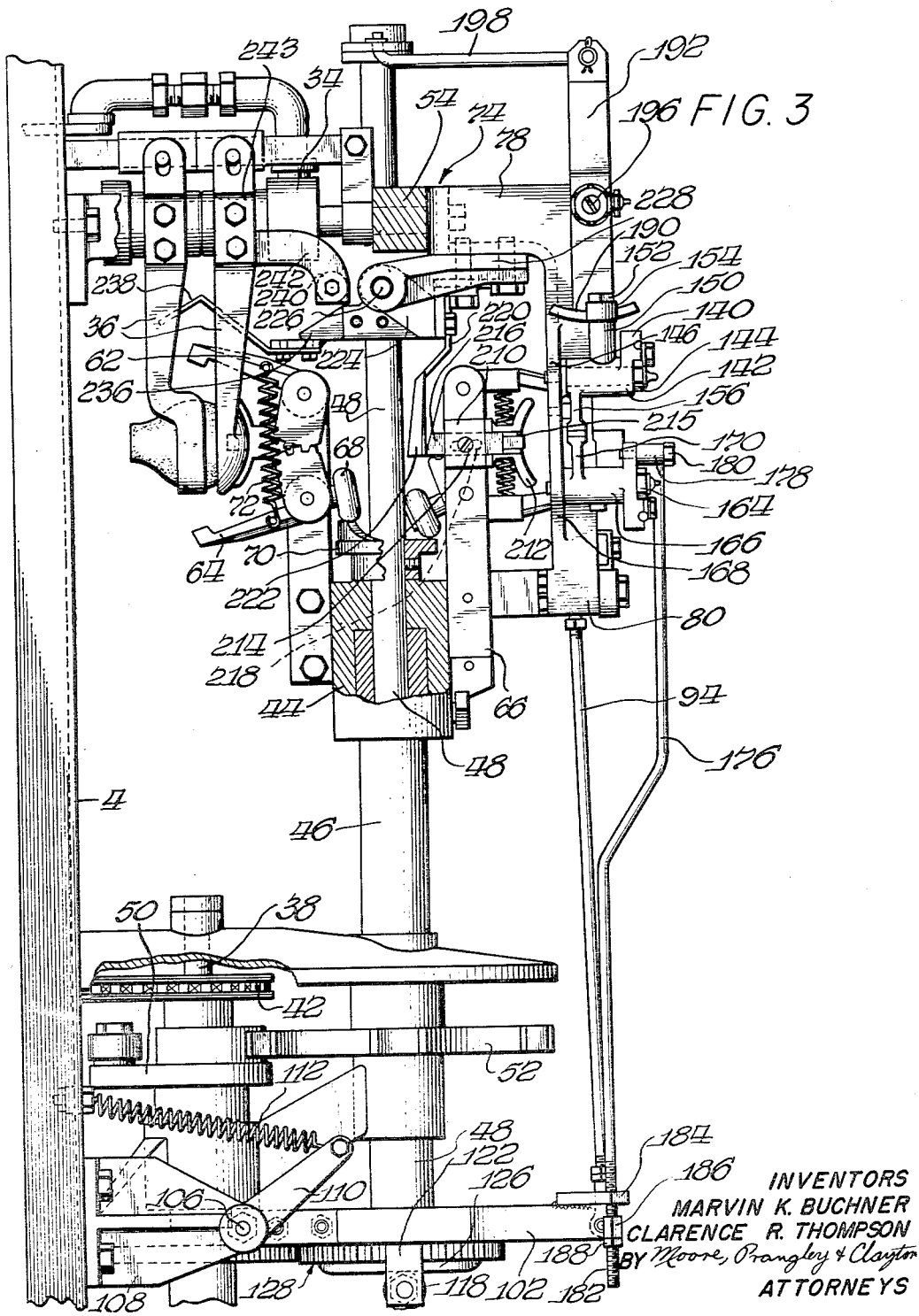

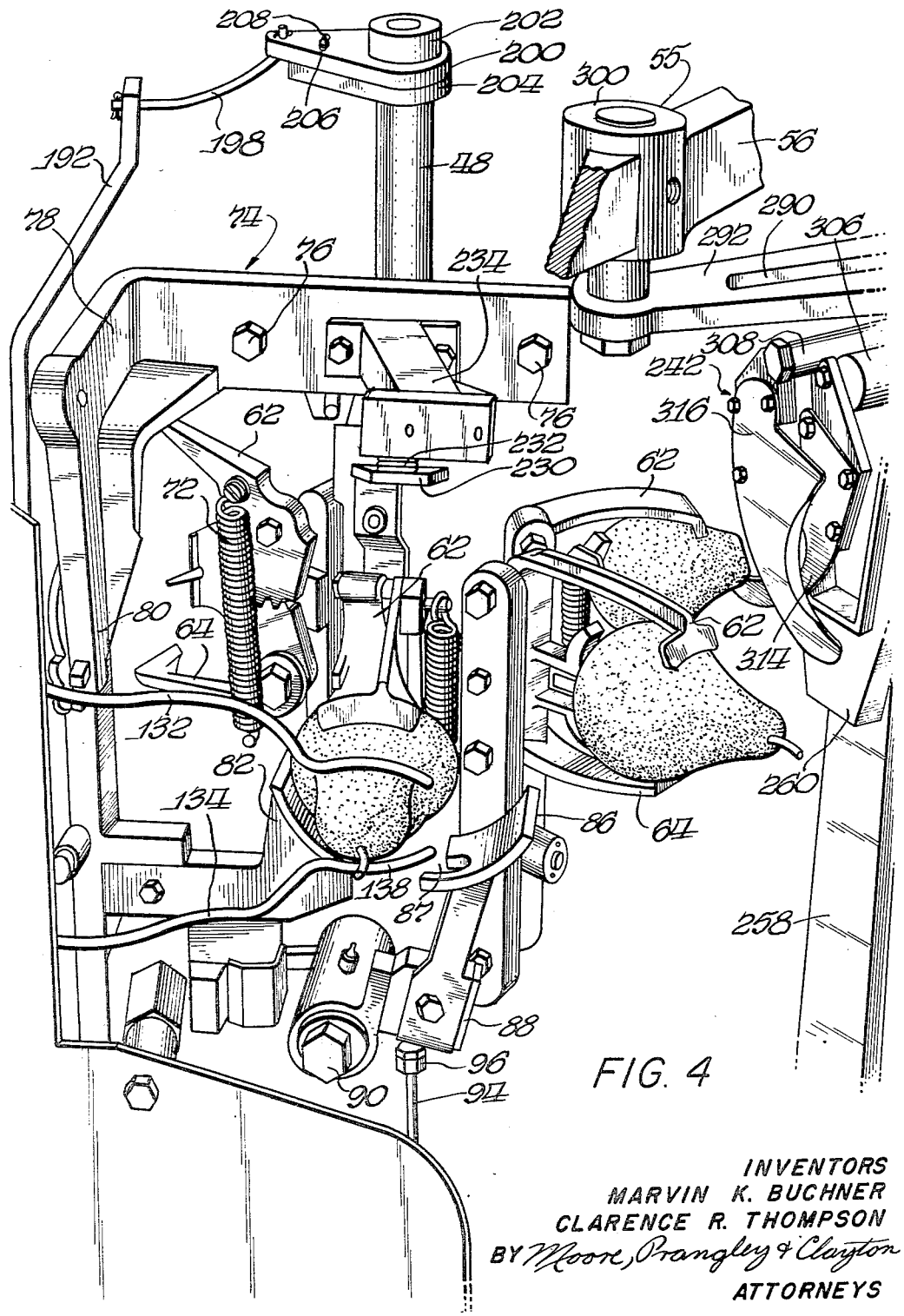

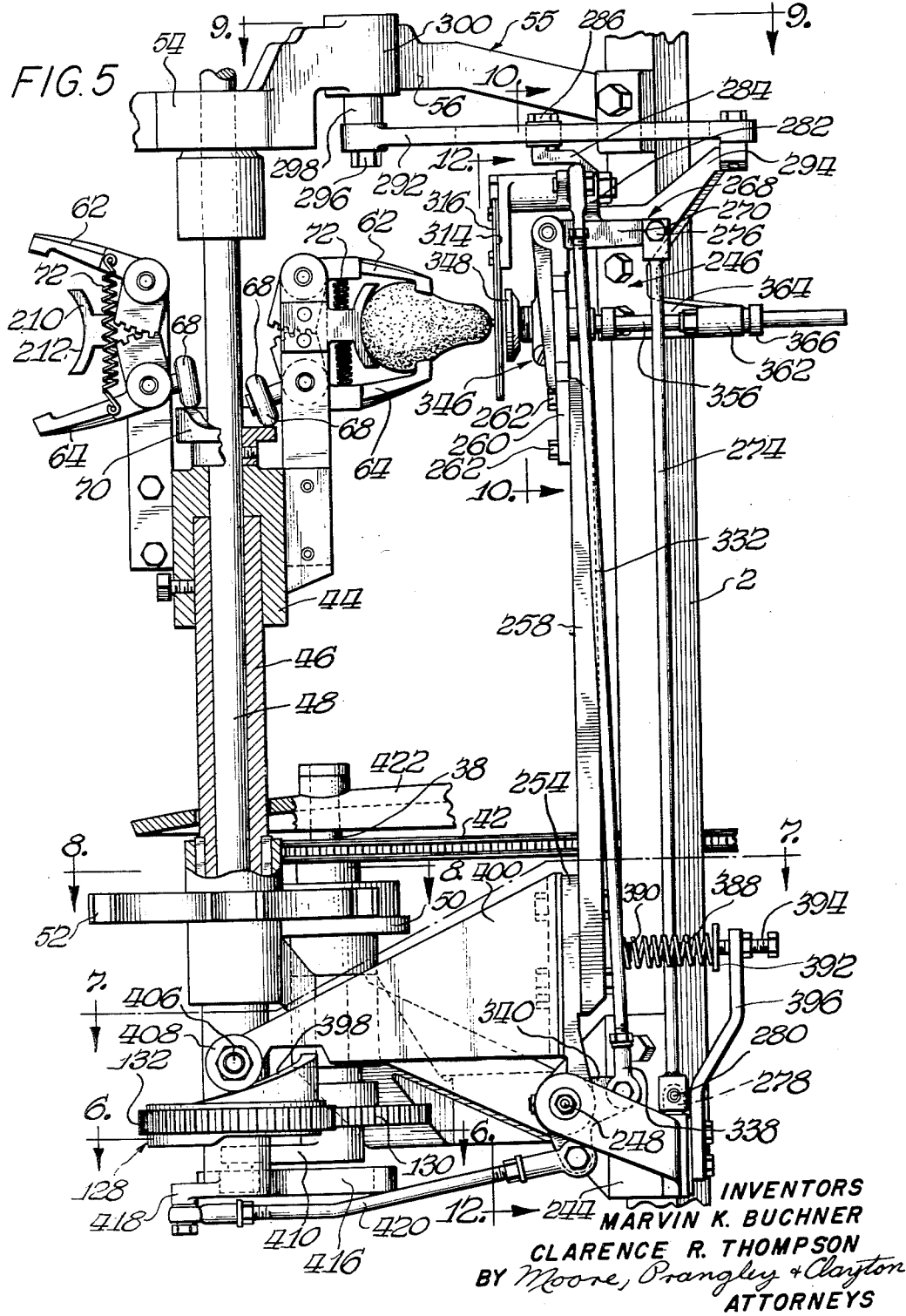

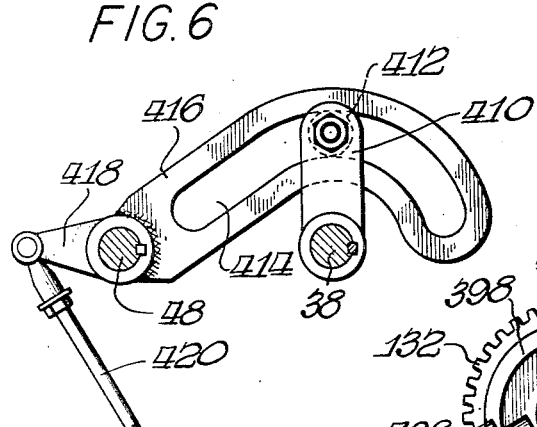
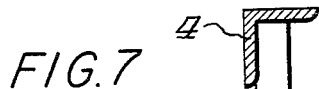
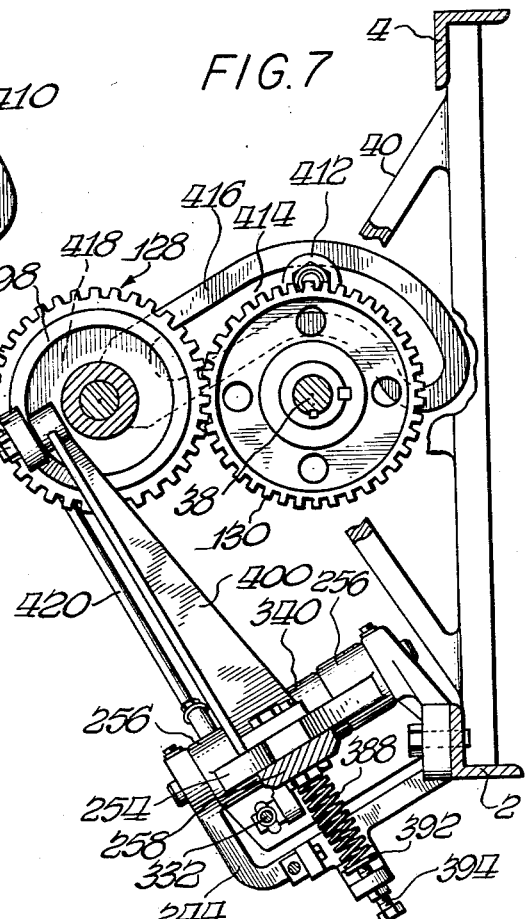
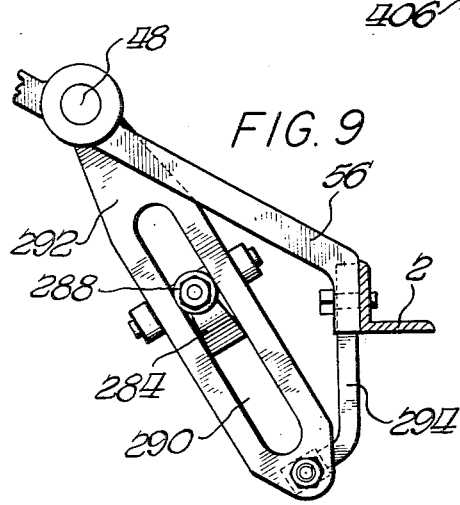
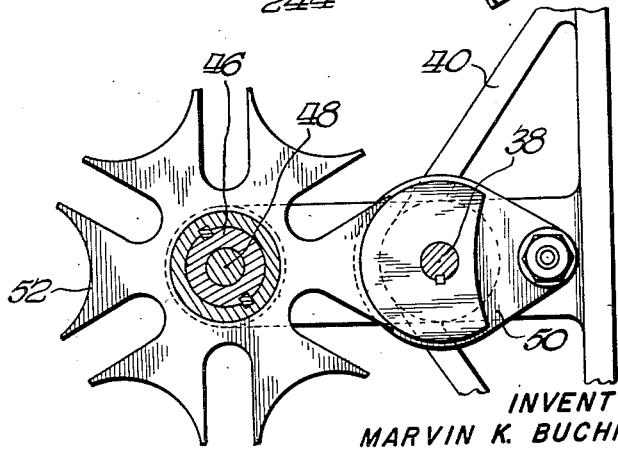

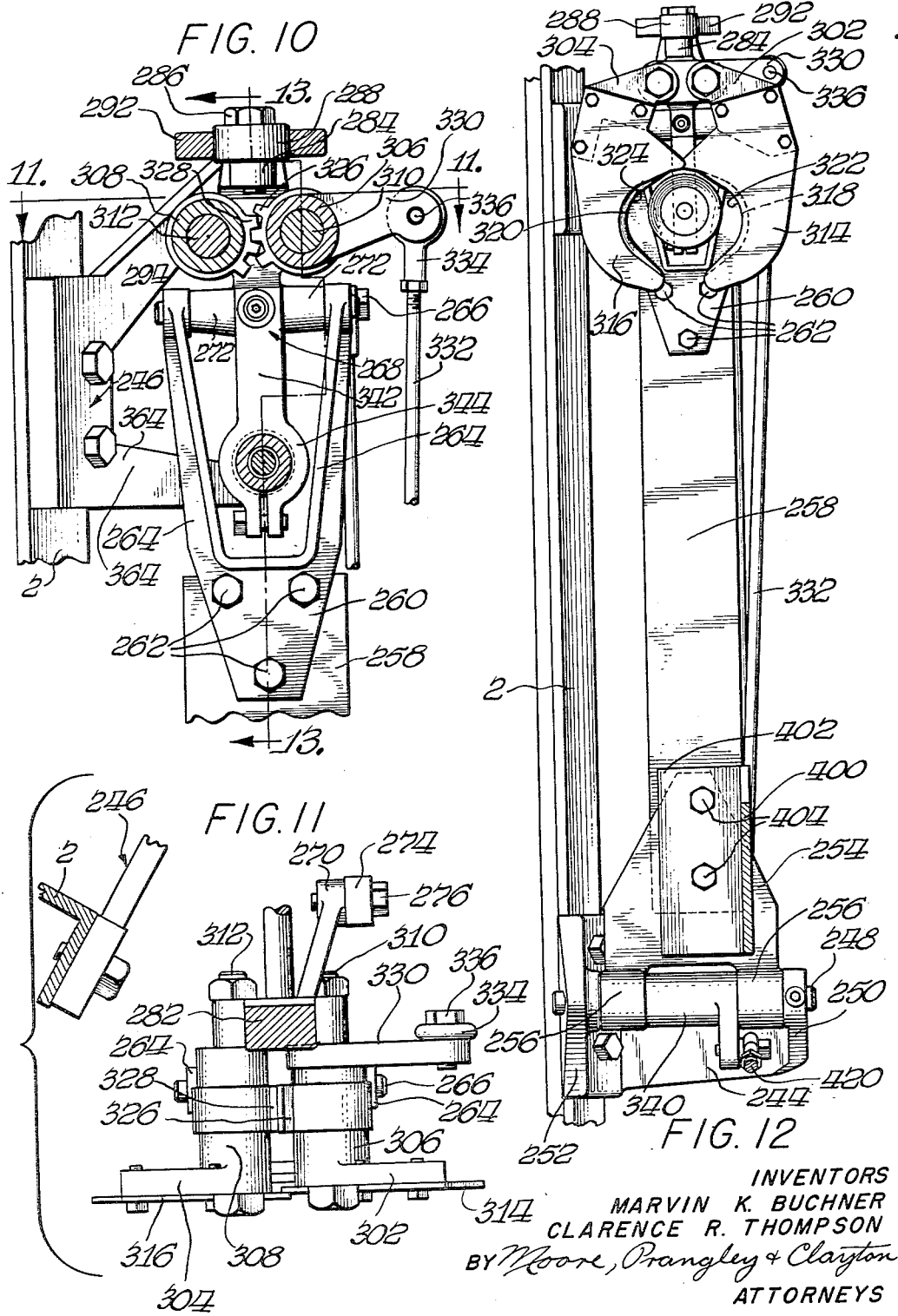

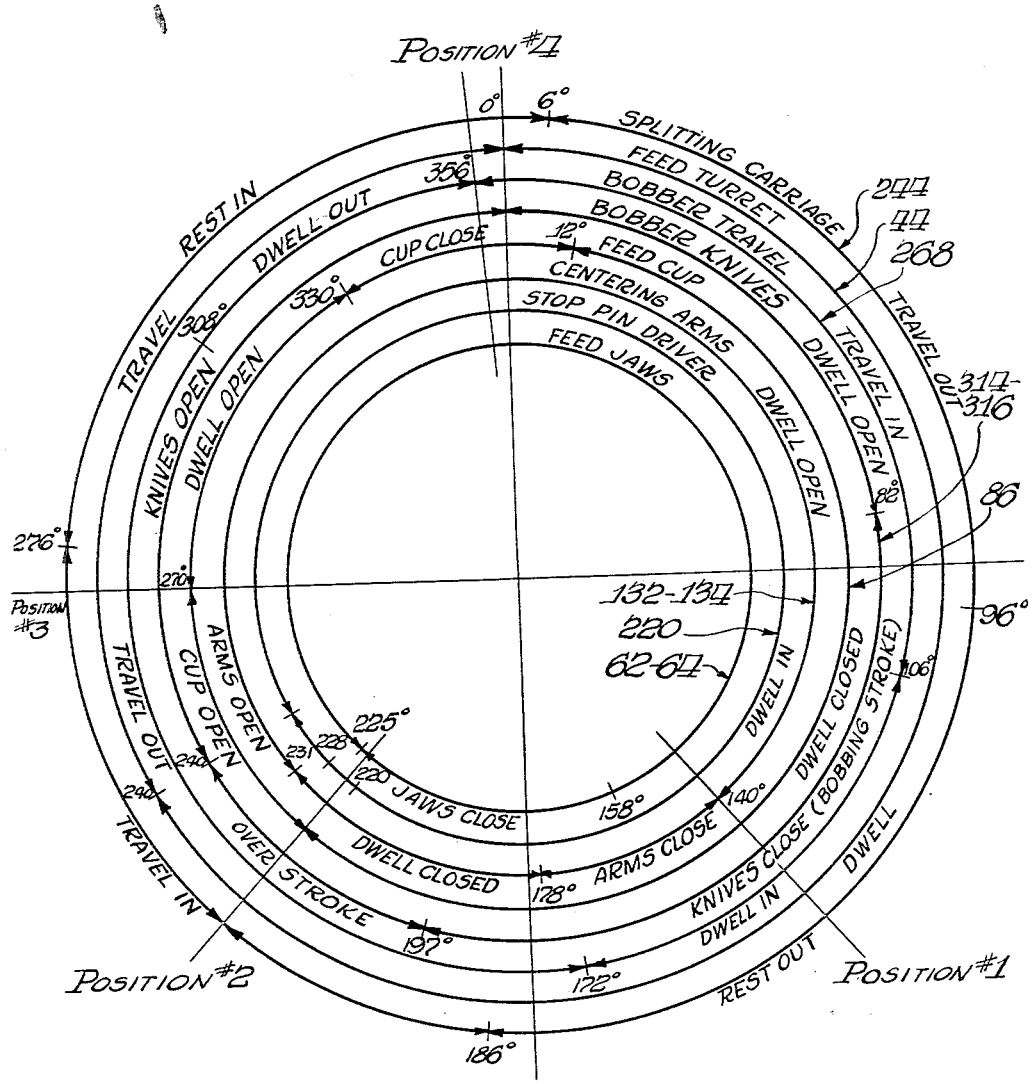

United States Patent Office 2,931,405
Patented Apr. 5, 1960

2,931,405

FRUIT PREPARATION APPARATUS

Marvin K. Buchner and Clarence R. Thompson, Olympia, Wash., assignors, by mesne assignments, to Food Machinery and Chemical Corporation, San Jose, Calif., a corporation of Delaware Application September 19, 1955, Serial No. 535,088

6 Claims. (Cl. 146—51)

This invention relates to a pear preparation machine and more particularly to pear feeding, aligning and bobbing mechanisms for a pear machine.

One of the chief problems in connection with the use of present commercial pear machines, such as disclosed in Ewald Patents 2,418,827, 2,284,647 and 2,321,590, is the proper positioning of the pears as they are inserted by operators into the machine and the maintenance of those proper positions as the pears are bobbed and then the bobbed pears transferred to the splitting mechanism and the peeling and coring mechanisms so that they are bobbed substantially at right angles to the stem axis, split through the middle of the stem axis and peeled and cored concentric to the stem axis. This problem has become increasingly serious as the speeds of operation of the machines have been increased and the efficiency of the machines have been increased and the labor available in canning plants has decreased with the consequent result that a seriously high percentage of the fruit prepared by the machines has been down graded in quality classification, or wasted, or useful only for dicing or other lower price purposes in which the appearance of the prepared fruit is not determinative of the quality classification or price.

It is accordingly an object of this invention to provide new and improved mechanisms for feeding and aligning pears and for bobbing pears so as to eliminate the need for inserting the pears in any precise position in the machines and to prevent misalignment of the pears due to the action of the bobbing mechanism, and to feed into the splitting, peeling and coring mechanisms of the machines pears which are properly aligned for splitting through the middle of the stem axis and for peeling and coring the pears concentric to the stem axis.

Another and further object of the invention is to provide pear feeding and aligning mechanisms or attachments, and a bobbing mechanism or attachment of the heretofore stated character which may be incorporated most readily in existing pear machines such as disclosed in said Ewald patents.

Further objects and advantages of the invention will be apparent from the following description when taken in conjunction with the accompanying drawings wherein:

Figure 1 is a view in side elevation of a pear machine such as shown in said Ewald patents above mentioned with pear feeding, aligning and bobbing mechanisms or attachments embodying the present invention;

Figure 2 is an enlarged, fragmentary view in front elevation of the feeding and aligning mechanisms of Figure 1;

Figure 3 is an enlarged, fragmentary view in side elevation opposite to that shown in Figure 1, of the pear feeding and aligning mechanisms of Figure 1;

Figure 4 is a fragmentary view in perspective of the pear feeding and aligning mechanisms and the bobbing mechanism;

Figure 5 is a fragmentary view in side elevation and partly in vertical section illustrating the bobbing mechanism and its cooperation with the feeder turret;

Figure 6 is a fragmentary view in horizontal section taken generally along the line 6—6 of Figure 5;

Figure 7 is a fragmentary view in horizontal section taken generally along the line 7—7 of Figure 5;

Figure 8 is a fragmentary view in horizontal section taken generally along the line 8—8 of Figure 5;

Figure 9 is a fragmentary view in horizontal section taken along the line 9—9 of Figure 5;

Figure 10 is a fragmentary view in vertical section taken along the line 10—10 of Figure 5;

Figure 11 is a fragmentary view in horizontal section taken along the line 11—11 of Figure 10;

Figure 12 is a fragmentary view in vertical section taken along the line 12—12 of Figure 5;

Figure 13 is a fragmentary view in vertical section taken along the line 13—13 of Figure 10;

Figure 14 is a fragmentary view in horizontal section taken along the line 14—14 of Figure 13;

Figure 15 is a fragmentary view in vertical section taken along the line 15—15 of Figure 14; and Figure 16 is a timing diagram illustrating the timing of the several parts of the feeding, aligning and bobbing mechanisms in relation to the transfer mechanism or splitting carriage of the existing Ewald pear machine, such as shown in said Ewald patents.

As shown in Figure 1 of the drawings, pear feeding, aligning and bobbing mechanisms embodying the present invention are shown in connection with a machine for splitting, peeling and coring pears as illustrated in Ewald Patents 2,284,647, 2,321,590 and 2,418,827, but it should be understood, however, that such mechanisms may be used in combination with the feeder turret for feeding bobbed pears into other pear machines.

Referring to the pear machine shown in the drawings, it comprises two front upright posts 2 and 4, Figures 1 and 2, and two similar rear upright posts 6, of which only one is shown, and suitable horizontal cross members such as 8 joining the four upright frame members at the top and adjacent the lower end to form a rigid box-like open frame structure.

The four corner posts, which are angle irons, are also connected at their top ends by a spider or frame 10 having arms which radiate from a central hub casting 12. The hub 12 carries a bearing (not shown) for a vertical shaft 14, which is driven continuously at its lower end through a series of gears (not shown) from a main driving shaft 16. A sleeve 18, encompassing a lower portion of the shaft 14, carries at its upper end the main feed turret 20 and at its lower end a driven member of a Geneva motion mechanism (not shown), driven by a suitable vertical shaft geared to the main driving shaft 16 so that the main feed turret 20 is driven intermittently to carry each pair of fruit cups 22 (of which there are four pairs), sequentially from a receiving or feeding station, to a peeling station 24, as illustrated in Figure 1. At the peeling station a vertically reciprocable head 25 carrying the peeling mechanism 27 is actuated by a cam (not shown) driven by shaft 16 in timed relation to the turret 20 and the peeling mechanism is actuated by a shaft 28 when the head is in its lower position in engagement with the half pears to peel the fruit. The turret 20 thereafter carries the peeled half pears to a coring and fruit discharging station, and from that station to a scavenging station at which the peels and cores are removed from the fruit cups, after which the pear cups are brought back to the receiving or feeding station, all as illustrated in Ewald Patent 2,418,827. A hood casting 26, such as disclosed in said Ewald patent, carries a bearing for the sleeve 18 and a suitable support (not shown) carries a bearing for the lower end of the shaft 14.

The vertical shaft 28 is journaled in suitable bearings secured to the front angle frame member 2 and is oscillated by a horizontal slide 30 driven by a suitable cam (not shown) on the main driving shaft 16 and connected by suitable levers to the shaft 28, and the shaft 28 is connected by suitable levers 32 to a transfer or splitting carriage 34, Figure 3, carrying four fruit gripping jaws 36 by which the fruit, after bobbing, is carried into the main pear machine, all as illustrated in said Ewald patents.

The Ewald pear machine also includes a shaft 38 (Figures 1, 3, and 5 to 8), journaled in a central arm of a generally triangular spider-like bracket 40 secured to the front frame posts 2 and 4, the shaft 38 being driven by a chain 42 and suitable sprockets (not shown) from a vertical driving shaft (not shown) of the main machine. A feeder turret 44 is secured to a sleeve 46, journaled on a vertical feeder shaft 48, and intermittently driven by a Geneva motion mechanism including a driving member 50 secured to the upper end of the shaft 38 and a driven member 52 secured to the sleeve 46 (see Figure 8).

The shaft 48 at its upper end is journaled in the outer cross arm 54 of an upper main supporting bracket 55 having side arms 56 and 58 (see Figure 2) secured to the front frame posts 2 and 4 of the main machine.

The feeder turret 44 carries six pairs of fruit gripping jaws 60, each pair of which comprises an upper jaw 62 and a lower jaw 64 pivoted upon an upstanding bracket or bar 66, secured to turret 44. The jaws are provided with intermeshing gear segments causing the jaws to move simultaneously to opened or closed positions as a cam roller 68 secured to an inward extension of the lower jaw is actuated by a cam 70 secured to the shaft 48 above the feeder turret 44. A coil spring 72 connected between the jaws urges the jaws to closed position.

Thus far the structures described are exemplary of the pear machine disclosed in said prior Ewald patents. The feeder, aligner and bobbing mechanisms which embody the present invention are constructed for ready attachment to said machine as additions to, and replacements for, the parts of said prior pear machine.

The feeder and aligner mechanisms or attachments comprise a main bracket or support 74 attached to the cross bar 54 of the head bracket 55 as by bolts 76 having an outwardly extending side arm 78 and a depending outboard arm 80. A half feed cup or section 82 is bolted to a plate 84 which is formed integrally with the bracket 74 at the lower end of the arm 80. The other half or section 86 of the feed cup is bolted to an arm or bracket 88 pivoted as by stud bolt 90 to an arm 92 also bolted to the bracket 74. The feed cups are provided with registering slots 87 (one being shown in Figure 4) to receive the lower fruit gripping jaw 64 when the latter is moved to gripping position. The feed cup 86 is swung downwardly in a clockwise direction, as seen in Figures 2 and 4, through an actuating rod 94 adjustably connected at its upper end to a connector 96 pivotally mounted on the bracket 88 and at its lower end adjustably connected to a connector 98 pivotally secured as by stud bolt 100 to the outwardly turned end of a lever 102 welded at its inner end to a hub 104 journaled on a stud bolt 106 (Figure 3) carried by a bracket 108 bolted to the front upright frame member 4. A lever 110 is also welded to the hub 104 and a spring 112 is secured at its outer end to a stud bolt 114, secured to lever 110 and at its other end to a lug or bracket 116 fastened to the upright frame member 4. A cam roller 118 is journaled on a stud 120 threaded in a supporting plate 122 and in a boss 124 welded to the plate 122. The plate 122 is welded to the lever 102 intermediate its ends, as seen in Figures 2 and 3. The cam roller 118 is actuated by the lower cam surface 126 of a combination gear and double cam 128. The combination gear and double cam 128 is journaled on the turret shaft 48 below the spider bracket 40 and is driven continuously by a gear 130 (Figures 5 and 7) which is secured to the Geneva crank shaft 38 below the bracket 40 and intermeshes with the gear teeth 132 of the combined gear and cam 128.

A pair of pear centering arms or fingers 132 and 134 is mounted for movement in front of the feed cup sections 82 and 86, as illustrated in Figures 2 and 4. The pear centering arms are formed of rods having curved outer feed ends 136 and 138 to engage the neck ends of pears inserted by the operator in the feed cup sections 82 and 86. The upper pear centering arm 132 is bolted at its inner end to a lever 140 formed integrally with a hub 142 (Figure 3) journaled on a stud bolt 144 threaded in a plate 146 integrally formed with the bracket 74. The rod 132 is received between supporting lugs 148 formed at the outer end of lever 140. The boss 142 has welded to it an upstanding boss 150 in which is secured a stud bolt 152 on which a cam follower roller 154 is journaled. The boss 142 is also formed integrally with a depending lever 156 formed at its lower end as a gear segment 158.

The lower centering arm 134 is bolted to a lever arm 160 formed as part of a generally triangular plate 162 having along its inner edge spaced lugs, not shown, similar to the lugs 148, through which the centering arm 134 passes and is supported. The plate 162 is journaled at one apex on a stud 164, the plate being formed integrally with a hub 166 through which the pivot bolt 164 passes and is threaded into a plate 168 integral with the arm 80 of the bracket 74. The boss or hub 166 of the lever plate 162 is also formed with an upwardly extending lever arm 170 formed at its upper end with a gear segment 172 meshing with the gear segment 158 so that the centering arms move simultaneously toward or away from each other. A coil spring 174 is secured at its upper end to a pin threaded in the lever 140 and at its lower end to a pin threaded in the lever 160 and normally urges the centering arms toward each other into fruit gripping and centering position. The pear centering arms are actuated to open position through a rod 176 welded at its upper end to a boss or sleeve 178 journaled on a stud bolt 180 threaded into the lever plate 162, and the lower end of the rod 176 is threaded as at 182 and passes through an opening in a plate 184 welded to the lever 102.

An adjusting nut 186 and a locking nut 188 are threaded on the portion 182 of the rod 176 below the plate 184. It will be seen that the rod 176 is thus actuated by the same cam surface 126 as the movable feed cup 86 and it will be noted that the nuts 186 and 188 are adjusted to secure the proper time relation between the downward movement of the feed cup 86 and the opening of the centering arms. This lost-motion connection between the rod 176 and the lever 102 also permits the feed cup section 86 to be moved to pear receiving position while the centering arms are maintained in open position.

The centering arms are maintained in open position, and the closing of the centering arms by the actuating spring is controlled by a lock cam 190 formed integrally with and extending transversely from one end of a lever 192 formed intermediately thereof with a boss or hub 194 journaled on a stud bolt 196 threaded into bracket 74 at the junction of the forwardly extending arm 78 and the depending arm 80. The lever 192 is connected by a connecting rod 198 to an actuating lever or crank 200 journaled on a hub 202 of a crank 204 keyed to the upper end of the feeder turret shaft 48. The lever 200 has an arcuate slot 206 receiving the shank of a locking bolt 208 threaded into the crank 204 to permit a precise adjustment of the lever relative to the crank to time the closing of the centering arms relative to the closing of the fruit gripping jaws. The surface of the cam 190 is made such that the centering arms 132 and 134 are caused to move gently to fruit engaging and centering position under the action of springs 174 so as not to injure the pear, or an operator's hand if caught between the centering arms.

A stop 210 for engaging the butt end of a pear inserted in the feed cup section 82 and 86 is positioned centrally between each pair of pear gripping jaws 62 and 64. The stop is formed with an arcuate outer surface 212 conforming generally to the butt end of the pear and thereby positioning the pear in definite radially spaced position from the axis of the feeder turret so that the pear is properly positioned for gripping by the jaws 36 of the transfer or splitting carriage 34 of the pear machine. Each stop 210 is secured to the mounting bar 66 for the associated pair of fruit gripping jaws 62 and 66 by a bolt 214. Each stop is formed with a groove 215 receiving a stop pin or pear penetrating spike 216 freely slidable therein, the spike having a slot 218 through which the mounting bolt 214 projects.

An actuating lever 220 for the slidable stop pin or spike 216 has a curved lower end 222 generally concentric to the shaft 48 and is bolted to a block 224 journaled on a pivot bolt 226 supported by bracket 228 bolted to the arm 78 of the bracket 74. The block 224 is centrally welded to a forwardly extending plate 230 (Figures 2 and 4) which is urged downwardly by a spring 232 inserted between the plate 230 and a block 234 bolted to the bracket 74, so that the actuator lever is urged in a clockwise direction, as shown in Figure 3, thereby permitting the stop pin or spike 216 to be pushed rearwardly by a pear as the operator inserts it in the cup sections 82 and 86 and pushes it back against the stop surface 212.

A bracket 236 is secured to the pivot block 224 and extends rearwardly and carries a generally V-shaped leaf spring 238 which extends toward the main pear machine between the opposed jaws 36 of the transfer or splitting carriage 34 and in the path of an actuating roller 240 mounted on a forwardly and downwardly extending arm 242 welded to a bracket 243 which is bolted to the transfer carriage 34 of the main pear machine.

It will be apparent from Figure 3 that after the opposed pairs of transfer jaws 36 have grasped the pear at the transfer station (which is opposite the feeder station at which the pears are inserted into the feeder turret) and as the transfer or splitting carriage 34 is moved toward the main pear machine away from the feeder turret shaft 48, roller 240 moves to the left in Figure 3 and engages and depresses the leaf spring 238 so as to swing the pivot block 224 in a counterclockwise direction, thereby causing the actuating lever 220 to press outwardly upon the stop pin or spike 216 and thereby project it into the butt end of the pear.

The bobbing mechanism 242 comprises, as best seen in Figures 4, 5, 7, 9, and 10 to 15, a lower supporting bracket 244 bolted to the front frame member 2, and an upper supporting bracket 246 also bolted to the frame member 2, adjacent to and below the top bracket 55 for the feeder turret. A pivot pin or bolt 248 is secured in opposed arms 250 and 252 of the lower mounting bracket 244 and a mounting plate 254, formed with spaced bosses 256, is journalled on the pivot pin 248. Plate 254 carries an upwardly extending bar 258 which is bolted thereto. The bar 258 carries at its upper end a supporting bracket 260 fastened thereto as by bolts 262. Bracket 260 is formed with spaced upwardly extending arms 264 carrying a pivot stud or bolt 266 upon which is supported a knife carrying bracket 268 having a central web 270 and integral bosses 272 at the forward end thereof which are journalled on the pivot bolt 266.

A vertically extending rod 274 is pivoted at its upper end as by pivot bolt 276, to the rear end of the web 270 of the bracket 268, and at its lower end is pivoted to an upstanding lug 278 of bracket 244, as by a pivot bolt 280 which lies in substantially the same horizontal plane as the pivot bolt 248 so that the mounting plate 254, the bar 258 and the bracket 260 form one arm of a parallel linkage, of which the other arm is formed by the rod 274, pivotally to support the knife carrying bracket 268.

The web 270 of the knife carrying bracket 268 is formed with an upwardly extending block 282 and from the block 282 there extends upwardly and forwardly an arm 284 in which is threaded a pivot bolt 286 on which is journaled a guide roller 288. The guide roller 288 is guided in a slot 290 of a guide bar 292 bolted at its rear end to an upwardly and inwardly extending arm 294 of the upper supporting bracket 246, and at its forward end the guide bar is secured by mounting bolt 296, and a spacer sleeve 298 to the boss 300 of the top supporting bracket 55 for the feeder turret.

A pair of knife mounting bars 302 and 304 are formed with integral bosses 306 and 308 journaled on pivot bolts 310 and 312 carried by the block 282 of the knife carrying bracket 268. Scissors-like bobber knives 314 and 316 are bolted to the arms 302 and 304. These knives are provided with oppositely beveled edges 318 and 320 forming arcuate shearing knife edges 322 and 324 for snipping off the stem ends of the pears as the knives are swung oppositely from the opened position of Figure 12 to the overlapping position of Figure 4. The bobbing knives 314 and 316 are caused to swing oppositely equal amounts by providing the bosses 306 and 308 with intermeshing segmental gear teeth 326 and 328.

The boss 306 of the knife carrying arm 302 is also formed with an integral, laterally extending arm 330 and an actuating rod 332 is adjustably secured to a connector 334 which is pivotally secured, as by pivot bolt 336, to the outer end of the actuating arm 330. The rod 332 at its lower end is adjustably secured to a connector 338 pivoted to one arm of a bell crank 340, by which the rod 332 is actuated to rotate the knife carrying arm 302 and simultaneously therewith the knife carrying arm 304.

The knife supporting bracket 268 is formed at its forward end with a depending arm 342 having at its lower end an internally threaded, split boss 344 to receive bobber stop assembly 346 which is formed with a dished stop or gauge 348 adapted to engage the stem end of the pear, thereby limiting the movement of the bobbing mechanism and positioning the bobbing knives 314 and 316 at a predetermined distance from the stem end of the pear so that the knives will snip or bob a piece of predetermined length from the stem end of the pear sufficient to remove all of the woody portion of the stem.

The bobber stop assembly 346 is formed with a tubular shank 350 which is externally threaded for threading into the split boss 344 of the knife carrying bracket and slidably contains a bob or stem ejector rod 352 having formed at one end a large head portion received in an enlarged bore within the shank of the bobber stop 346, and at its other end an enlarged portion or collar 354 which is adapted to engage and be actuated by an actuating rod 356. The rod 356 is slidably mounted in a bushing 358 secured as by nut 360 to a boss 362 formed on the outer end of a rearwardly extending lower arm 364 of the upper mounting bracket 246. The rod 356 is provided with a collar 366 and passes through an enlarged slot in the end of an arm 368 of a bell crank pivoted by pin 370 to a bracket 372 bolted to the outer guide plate 374 for the peeling head slide 25 of the main pear machine. The other arm 378 of the bell crank carries a pivot bolt 380 on which is journaled a cam roller 382 actuated by a cam 384 in the form of an L-shaped member or angle bar bolted to the peeling head slide 25. It may be noted (Figure 15) that the angle bar cam 384 is provided with vertically disposed slots through which the mounting bolts 386 pass, so that the time of operation of the bob ejector rod 356 may be precisely determined in relation to the downward movement of the peeling head slide 25.

It should be noted that the guide bar 292 for the bobbing mechanism extends radially relative to the axis of the shaft 48, as shown in Figure 9, at such an angle that two intermittent movements of the feeder turret are sufficient to carry a pear held in a pair of fruit gripping jaws 62 and 64 from the feeder station to the bobber station when the pear is precisely aligned with the path of movement of the bobbing mechanism. The bobbing mechanism is moved forwardly and inwardly toward the shaft 48 of the feeder turret by a coil spring 388 mounted at one end on a pin 390 secured to the bar 258 and at its other end on a pilot pin molded in a spring retainer 392 carried by an adjustable mounting bolt 394 threaded through the outer end of a bracket 396 fastened to the lower mounting bracket 244 for the bobbing mechanism. The bobbing mechanism is moved outwardly away from the shaft 48 of the feeder turret by the cam surface 398 of the combined gear and double cam 128. A generally triangular lever 400 (see Figure 5) is formed with an end flange 402 (Figure 12) overlying the pivot plate 254 to which it is secured by bolts 404. The lever 400 carries at its forward end a pivot bolt 406 on which is journaled a cam roller 408 that rides upon the cam surface 398.

The continuously rotating shaft 38 (see Figures 1 and 6) has keyed to its lower end a crank 410 carrying at its outer end a roller 412 received in a cam slot 414 of a lever 416 which is keyed to the lower end of shaft 48 of the feeder turret so as to oscillate said shaft through the desired angle as the shaft 38 is rotated continuously. The lever 416 also has welded to it a crank arm 418 connected by pitman rod 420 to the bell crank 340 by which the bobber knives are opened and closed.

*Operation of the machine*

In the use and operation of the machine, the operator is merely required to insert the pear butt end-foremost into the feed cup sections 82 and 86, placing the butt end of the pear against the surface 212 of the stop 210 associated with that pair of fruit gripping jaws 62 and 64 which at the time is in alignment with feed cup sections 82 and 86. The operator then withdraws her hand, leaving the pear resting in the feed cup sections 82 and 86 with its stem end protruding beyond those cup sections, as illustrated in Figures 1 and 4.

We may assume that at this instant of time the parts are in position No. 1 in the timing diagram of Figure 16. At that time the splitting carriage 34 is at rest in outward position, as illustrated in Figure 3; the feeder turret 44 is at rest or "dwell"; the bobber knife carriage 268 is at rest in its innermost position, i.e., nearest the feeder turret, and the bobber knives 314 and 316 are in process of closing to bob a pear if there is a pear positioned at the bobbing station; the feed cup section 86 is in elevated or closed position; the centering arms 132 and 134 are at the point where they will being to move to closed position, i.e., into engagement with the neck of the pear to center the pear in the cup sections 82 and 86; the stop pin driver or actuator 220 is in its inward position so that the shiftable stop pin 216 was permitted to move inwardly as the operator pushed the pear against it and into engagement with the curved surface 212 of the stop 210, and the feeder jaws 62 and 64 are in open position. During the next 30° upon the timing diagram the centering arms move toward each other until one of them engages the neck of the pear and vertically turns or rolls the pear in the feed cup sections until the other centering jaw engages the neck of the pear when the jaws are thereby stopped from further movement. This approaching movement of the centering arms is caused by the spring 174 for during that time the feeder turret shaft 48 is being oscillated in such a direction that the locking cam 190 permits the arm 150 of the upper centering arm carrier 140 to move in a clockwise direction under the action of said spring. During this approaching movement of the centering arms the actuating rod 176 for the centering arms is permitted to move independently of the lever 102 by reason of the lost motion connection between the rod and the plate 184 carried by the lever 102.

After the centering arms have begun their approaching movement to center a pear in the feed cup sections, the fruit gripping jaws 62 and 64 at the feeding station begin to close under the action of their closing spring 72 as controlled by the cam 70 as it oscillates with the feeder turret shaft 48. By the time these jaws have closed sufficiently to grip the pear in the feed cup sections, the centering arms have completed their movement and have centered the pear so that its stem is in a horizontal plane midway between the jaws and in the same horizontal plane as the center or axis of the stop gauge 348 of the bobbing mechanism.

Shortly after the feed jaws begin to close the constantly rotating cam surface 398 of the combined gear and double cam 128 begins to lift the cam roller 408 and thereby swing the parallel linkage supporting the bobber knife carriage 268 outwardly, but the initial movement of the bobber carriage is so slight during the end portion of the period during which the bobbing knives are being closed that the movement of one does not interfere with the movement of the other.

At position 2 on the timing diagram the feed cup section 86 is at the point of beginning to move downwardly or toward open position. Before that position is reached the splitting carriage has begun to move inwardly toward the main pear machine, i.e., to the left, as shown in Figure 3, the centering arms have been fully closed, and the feeder jaws 62 and 64 have firmly gripped the pear. The stop pin driver or actuator 220 is at position 2 in the process of being swung outwardly due to the movement of the roller 240 over the leaf spring 238 as the splitting carriage moves inwardly toward the main pear machine, and the stop pin driver pushes the stop pin 216 into the butt end of the pear so that the pear is firmly held and centered in the gripping jaws 62 adn 64 and against downward movement or slippage of the butt end of the pear relative to the stop 210 before the feed cup 86 has left the pear, so that the pear is firmly held at three points in its centered position with its stem axis in the same horizontal plane as the axis of the stop gauge of the bobbing mechanism.

As the parts move from position 2 to position 3 in the timing diagram, the feed cup section 86 is moved downwardly by the lower cam surface 126 of the combined gear and double cam 128 acting through the cam roller 118, the lever 102 and the actuating rod 194, so that the cup is swung out of the path of the pear and of the lower gripping jaw 64 when the feeder turret begins one of its intermittent movements. During this period the feeder turret 44 begins to move through its permitted angle of movement of 60° under the action of its Geneva motion drive mechanism. Shortly after the feed cup section 86 begins to move downwardly the plate 184 carried by the lever 102 engages the adjustable nut 186 carried by the centering arm actuating rod 176 and the centering arms are therefore moved away from each other to opened position. The stop pin driver or actuator 220 is moved inwardly after the spike 216 has been driven into the pear by reason of the fact that the actuating roller 246 carried by the splitting carriage passes the leaf spring 238 and the spring 232 then urges the actuator 220 to its inward position.

The splitting carriage 34 during this time continues to move inwardly toward the main pear machine and to carry the pear across the splitting and spreading plates, as disclosed in said Ewald patents, and the bobber knife carriage also continues to travel outwardly to clear the path of a pear now being advanced to the bobbing station.

As the parts move from position 3 to position 4 upon the timing diagram of Figure 16, the splitting carriage 34 completes its inward movement and remains at rest in that position; the feeder turret 44 continues to turn and approaches the end of its intermittent 60° movement as position 4 is reached; the bobber knife carriage 268 completes its outward movement and remains at rest in outward position and at position 4 is at the point of beginning to move inwardly so as to position the stop gauge in engagement with the stem end of the pear at the bobber station after the feeder turret has completed its movement. The bobber knives 314 and 316 are during this period in the process of being opened as the cam lever 416 moves in a direction to rotate the actuating bell crank 340 in a counterclockwise direction, as seen in Figure 5, whereby to swing the knife actuating crank 330 in a counterclockwise direction, as seen in Figures 10 and 12, so that the bobber knives are in full opened position and at rest by the time the bobber carriage has moved inwardly sufficiently to position the stop gauge in engagement with the stem end of the pear so that the bobber knives will be positioned on opposite sides of the pear.

It will be evident that the distance of movement of the bobber knives is determined solely by the length of the pear, for the bobber carriage is moved inwardly by the spring 388, Figure 5, under the control, as to rate of inward movement, by the declining portion of the cam surface 398, the stop gauge 348, however, determining the limit of that inward movement by reason of its engagement with the free or stem end of the pear. As the bobber carriage 268 moves inwardly, it carries the bobber stop assembly 346 including the rod 352 which, however, is free for relative movement in the opposite direction as the rod 352 moves away from the ejector rod 356. If the rod 352 remains in that relative position in the stop assembly as illustrated in Figure 13, as the bobber approaches the pear at the bobbing station, then the forward end of the rod 352 will engage the pear and be held against further movement as the stop gauge 348 continues to move toward the pear, so that the rod 352 is pushed back into the shank portion 350 of the stop assembly.

After the bobber carriage has moved inwardly toward the feeder turret to the extent permitted by the engagement of the stop gauge 348 with the stem end of the pear, then the bobber knives are swung toward each other as the cam lever 416 now operates in a direction to swing the bell crank 340 and thereby the knife actuating crank 330 in a clockwise direction, as seen in Figures 5, 10, and 12, and the knives shear the stem end from the pear at a right angle to the horizontal stem axis of the centered and aligned pear which is firmly gripped by the jaws 62 and 64 and by the spike 216 projected into the butt end of the pear and thereby against shifting from its position in which the stem axis of the pear extends radially of the feeder turret. Therefore, the bobbed pear is properly aligned so that when the bobbed pear is carried to the transfer station it will be aligned with the splitting blade and as the pear is carried across the splitting plate by the splitting carriage 34 it will be split along the middle of the pear.

The bobbing knives continue to swing in the same direction after they have bobbed the end of the pear and during an "over-stroke" period, as shown in the timing diagram. The bobbed end of the pear is thus confined between the bobbing knives and the stop gauge 348 until, as the bobber carriage travels outwardly and the bobbing knives are swung toward opened position, the bobbed end of the pear is free to drop away from the bobbing mechanism onto the hood which protects the driving mechanism from the falling pear waste or scrap and directs the waste to the sides of the machine for collection in suitable receptacles.

If the bobbed end of the pear adheres to the stop gauge 348, as may frequently be the case due to the stickiness of the pear juice, then as the bobbing mechanism moves outward the rod 352 is brought into engagement with and moves the actuating rod 356 outwardly or to the right, as seen in Figure 13, until as the peeling head slide 376 approaches its downward limit of movement the cam surface of the angle bar cam 384 engages the cam roller 382 and swings the arm 378 of the bell crank, pivoted on pin 370, in a clockwise direction, in Figure 14, so that the arm 368 of the bell crank, acting on the collar 366, forces the actuating rod in the opposite direction and projects the rod 352 through the shank of the stop assembly 346 and thereby ejects the adhered bob from the stop gauge 348.

It should be noted that the threading of the shank of the stop assembly into the dependent arm 342 of the bobber knife carriage 268 permits adjustment of the stop gauge 348 relative to the planes of the bobbing knives so that the length of pear to be bobbed may be readily changed whenever necessary or desirable, as for example, when a pack of abnormally long or short pears are being run through the machine.

It will be apparent that the feeding, aligning and bobbing mechanisms, as disclosed herein, permit the use of the most unskilled labor for inserting the pears into the feed cup sections 82 and 86, by eliminating the necessity for any very precise positioning of the pears in those feed cups, and yet assures that the pears even if inserted in a very rough way into the machine are automatically centered and aligned and held in that centered and aligned position as they are carried to the bobber mechanism, and from the bobber mechanism to the splitting carriage, so that they will be properly and precisely centered and aligned for conveyance into the main pear machine across the splitting and spreading plates thereof so as to be split along the middle of the pears and properly positioned in the cups of the main turret so as to be properly peeled and cored concentrically to the stem axis of the pear.

It will further be apparent that the bobbing mechanism herein disclosed effects the bobbing of the pear without any substantial tendency to cause sidewise shifting of the pear as it is bobbed, for the bobbing knives strike the pear from opposite sides and thereby apply force to the pear from equal and opposite directions at the same time and the properly timed operation of the bobbing mechanism in relation to the feeder turret and fruit gripping jaws is positively assured by the combined gear and double cam and the other inter-related driving connections between the driving shaft 38, the turret 44, the turret shaft 48, the bobber knife carriage and the bobbing knives.

Having thus described the invention, what is claimed as new and desired to be secured by Letters Patent is:

1. In a pear feeding and aligning apparatus for a pear preparation machine, a pair of relatively shiftable cup sections to receive a pear with its neck end protruding, a pair of relatively shiftable centering members engaging the neck of the pear to align and center the pear in said cup sections, a moving carrier having means to abduct the pear from said cups after the centering and aligning of the pear, and means for shifting said cup sections relatively in timed relation to said carrier to release the pear to the carrier.

2. In a pear feeding and aligning apparatus as set forth in claim 1 wherein means is provided for moving said pear centering and aligning members away from each other in timed relation to the relative shifting of said cup sections and the movement of the carrier.

3. In a pear feeding and aligning apparatus for a pear preparation machine having a feeder turret provided with a plurality of pairs of fruit gripping jaws, the paws of each pair being relatively movable between an open position and a fruit gripping position, a pair of relatively shiftable open top cup sections for receiving pears with their neck ends protruding beyond the cup sections, said cup sections being positioned to support the pear in the path of a pair of fruit gripping jaws at a feeder station, a pair of pear centering and aligning rods mounted for movement to engage the protruding neck end of the pear in the said cup sections, said pear centering and aligning rods being mounted for movement between an open position and a pear engaging and centering position, means for moving said pear centering rods to pear engaging and aligning position prior to the closing of said fruit gripping jaws, and means operatively connected to said turret for moving said fruit centering rods to open position, said fruit gripping jaws to fruit gripping position and thereafter said cup sections relatively away from each other to clear the path of said fruit gripping jaws upon movement of said turret.

4. In a pear feeding and aligning apparatus as set forth in claim 3 wherein the turret is provided with a pear stop associated with each pair of fruit gripping jaws to engage the butt end of the pear at the feeder station and position the pear radially relative to the turret, a pear impaling member shiftably mounted on said stop for penetration into the butt end of the pear along its stem axis when the pear has been centered and aligned in said cup sections, and means for actuating said impaling member into pear impaling position, between the closing of the fruit gripping jaws and the relative shifting of the cup sections away from each other.

5. In a pear feeding and aligning apparatus, pear holding means comprising cooperative cup sections adapted to receive and position thereon a whole pear, a conveyor, fruit gripping members carried by the conveyor and adapted to be positioned to abduct the fruit from said cup sections, pear centering and aligning members movable in opposite directions to engage and center the pear in said cup sections prior to abduction by said gripping members, and means for actuating said pear centering members in timed relation to said conveyor to center the pears in said cup sections and thereafter release the same to said gripping members.

6. In a pear feeding and aligning apparatus, pear holding means comprising cooperative cup sections relatively movable and adapted to receive and position thereon a whole fruit with its neck end protruding, a fruit conveyor, fruit gripping members carried by said conveyor and adapted to be positioned directly over and under the fruit while resting in the cup sections, means for closing the gripping members upon the fruit, the shiftable cup section having an opening in the base thereof to permit passage of a gripping member when the cup section is in fruit receiving position and to clear the path of the member on shifting of said section, means for actuating said conveyor to shift said gripping members with the fruit therein away from said cup sections, a pair of relatively shiftable centering members engaging the neck of the fruit to center and align the fruit in said cup sections and means operatively connected to the conveyor actuating means for shifting said centering and aligning members and shifting said cup sections relatively to permit the extraction of the fruit from said cup sections by the gripping members in timed relation with the closing of the gripping members and the movement of the conveyor.

References Cited in the file of this patent

UNITED STATES PATENTS

| | | |
|---|---|---|
| 2,161,806 | Ewald | June 13, 1939 |
| 2,284,647 | Ewald | June 2, 1942 |
| 2,321,590 | Ewald | June 15, 1943 |
| 2,418,827 | Ewald | Apr. 15, 1947 |
| 2,502,797 | Luhdorff et al. | Apr. 4, 1950 |
| 2,738,819 | De Back et al. | Mar. 20, 1956 |